(12) United States Patent
Clark et al.

(10) Patent No.: US 6,219,345 B1
(45) Date of Patent: Apr. 17, 2001

(54) TIMING ESTIMATION IN MOBILE COMMUNICATION SYSTEMS USING PARABOLIC INTERPOLATOR

(75) Inventors: Ricke W. Clark; Jaleh Komaili, both of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/163,640

(22) Filed: Sep. 30, 1998

(51) Int. Cl.[7] ................................................. H04B 7/212
(52) U.S. Cl. .......................................... 370/337; 370/328
(58) Field of Search .................................. 370/321, 324, 370/337, 345, 347, 350, 328, 329, 343, 346, 348

(56) References Cited

U.S. PATENT DOCUMENTS

| | | | |
|---|---|---|---|
| 4,602,375 | * | 7/1986 | Inukai ................................... 370/324 |
| 5,276,706 | * | 1/1994 | Critchlow ............................. 375/343 |
| 5,553,064 | | 9/1996 | Paff et al. . |
| 5,898,684 | * | 4/1999 | Currivan ............................... 370/350 |

* cited by examiner

Primary Examiner—Douglas W. Olms
Assistant Examiner—Ricardo M. Pizarro
(74) Attorney, Agent, or Firm—Howrey Simon Arnold & White, LLP

(57) ABSTRACT

The present invention discloses an improved system and method for increasing the timing accuracy of a time domain multiple access (TDMA) mobile communication system using a resource efficient parabolic interpolator. With the present invention, a mobile unit receives burst transmissions from a base station and a timing information is recovered therefrom. Since the timing information establishes the time of arrival of the burst, correlation initially identifies a coarse approximation of the location of the control signal within a defined portion of the burst signal and, together with two adjacent samples. Using a curve fitting technique, a precise position of the peak, relative to the coarse position, is determined. The equation can be solved ahead of time and values from the three samples substituted into a single expression for evaluation. Once the coefficients of the equation are known, the time offset of a refined peak relative to the coarse peak is readily calculated. The refined peak is then used in synchronizing transmission between a mobile unit and the base station.

18 Claims, 1 Drawing Sheet

TIMING ESTIMATION IN MOBILE COMMUNICATION SYSTEMS USING PARABOLIC INTERPOLATOR

BACKGROUND OF THE INVENTION (1) Field of the Invention

The present invention relates in general to time domain multiple access (TDMA) mobile communication systems.

(2) Description of Related Art

One standard for mobile communication is the global system for mobile communication (GSM) which is a widely used form of TDMA digital wireless telephony technology. Being a mobile system, power consumption is of primary concern since batteries are heavy and expensive. Further, if power drain is high, use of the mobile telephone will be limited by battery life. Clearly, it is desirable to minimize power consumption in mobile communication applications.

One way of limiting power drain is by minimizing the amount of time the receiver section is powered especially since transmissions in TDMA based systems are received in spaced bursts of information. As will be appreciated, timely application of power to the receiver section of the mobile unit is highly dependent on remaining closely synchronized with the transmission rate of the base station. Such synchronization is even more critical as the mobile unit roams from one base station to another. Accordingly, GSM systems rely on extracting the timing information required for synchronization with the base station during an active call from the burst. Mobile needs to obtain this information with accuracy of ⅛ th of a bit to ensure synchronization with the base station.

Traditionally, a software implemented finite impulse response (FIR) filter is used to locate the position of such signal. Typically, the FIR filter will have a large number of taps. e.g., ninety-six or more taps in order to ensure the necessary accuracy in recovering the timing information with desired accuracy. However, it will be appreciated that software filtering is computationally demanding in terms of compute time, system resources (for example, each tap coefficient must be stored together with intermediate calculated values) and power drain.

By way of example, in a ninety-six tap FIR filter, the filtering process will perform 96 multiply and accumulate operations on every sample. And since the signal must be filtered in real time, the processor must be fast enough to fully execute the filter process. It being well known that power consumption increases as the operating rate of the processor increases since power is proportional to switching activity.

Although it is possible to improve timing resolution by over-sampling the burst signal and rapidly processing the signal within the GSM frame rate, it will be appreciated that processors operating at a clock rate sufficient to process will have high power consumption.

SUMMARY OF THE INVENTION

To overcome the limitations in the related art described above, and to overcome other limitations that will become apparent upon reading and understanding this specification, the present invention discloses an improved system and method for increasing the timing accuracy of a time domain multiple access (TDMA) mobile communication system. In TDMA systems correct operation depends on proper timing of the transmission and reception of signal bursts. Accordingly, transmissions between a base station and a plurality of mobile units must compensate for transmission delay so as to avoid collision of bursts. The mobile in GSM is required to obtain the timing with a ⅛ th bit period accuracy. Since sampling and processing at such a high rate introduces excessive power consumption and cost, the next best thing is to obtain such accuracy via interpolation. The most common method of interpolation for obtaining high accuracy is filtering. To increase timing accuracy, the present invention employs a resource efficient parabolic interpolator that performs local curve fitting to refine the location of an embedded peak after digitization of the burst signal. In the context of the present invention, we can use a local interpolation due to the fact that a coarse peak location is known and the fact that a TDMA system is band-limited.

With the present invention, the burst signal is digitized, stored and an embedded peak in a mid-amble of the burst is located. Specifically, the largest sample obtained from a correlation between received mid-amble with a copy of mid-amble residing in the receiver is selected together with two adjacent samples. The largest sample is designated as a coarse approximation of the embedded peak. The first of the two adjacent samples is merely the immediately preceding sample and the second is the immediately following sample.

A second order polynomial is then fitted to these three samples and the sample values substituted in to a single expression for evaluation to determine the time offset of a refined peak relative to the coarse peak. Since the present invention minimizes the number of processing steps necessary to locate the refined peak, a relatively slow processor may be used.

Advantageously, compute time and power consumption are significantly reduced since the plurality of multiply and accumulate operations necessary to locate the refined peak using a FIR filter are replaced by a single divide and a relatively insignificant number of addition and multiply steps. Further, system resources are minimized since there is no need to store filter coefficients or intermediate calculations.

Once the time offset of the refined peak relative to the coarse peak is known, the offset may be used to position the peak in one of a plurality of bins defined between the coarse peak and each of the adjacent samples. In this manner, the refined peak is more precisely located and system-level timing of the mobile unit more accurately synchronized with the base station.

These and other advantages of the present invention not specifically described above will become clear within the detailed discussion herein.

DETAILED DESCRIPTION OF THE INVENTION

Figure 1:
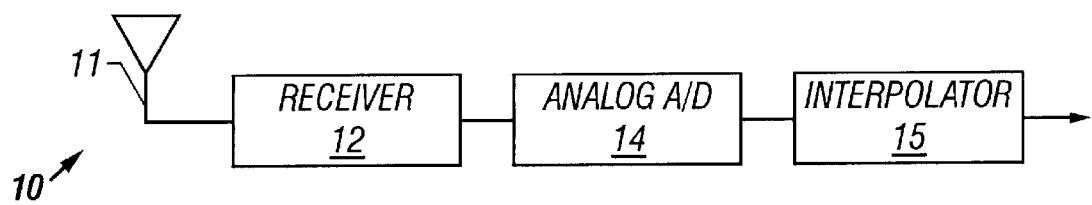
FIG. 1 is a system block diagram.

In the following description of the preferred embodiment, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with a GSM mobile telephone system. However, it is contemplated that the present invention can be used in other time domain multiple access ("TDMA") mobile communication applications.

Reference will now be made in detail to the preferred embodiments of the invention, examples of which are illustrated in the accompanying drawings. Wherever possible, the same reference numbers will be used throughout in the drawings to refer to the same or like components.

Referring now to FIG. 1, a portion of the receive circuit 10 of a TDMA mobile communication device is shown. Circuit 10 has an antenna 111 that receives control and information encoded radio signals from a base station (not shown). Antenna 11 feeds the signal to a radio receiver 12. The output of receiver 12 is fed to an integrated analog device 14 to recover encoded information. Device 14 samples an intermediate frequency of the output signal from receiver 12 to develop base-band complex digital samples. These samples are sequentially stored in memory or other storage media (not shown) and processed to determine the control signal.

Figure 2:
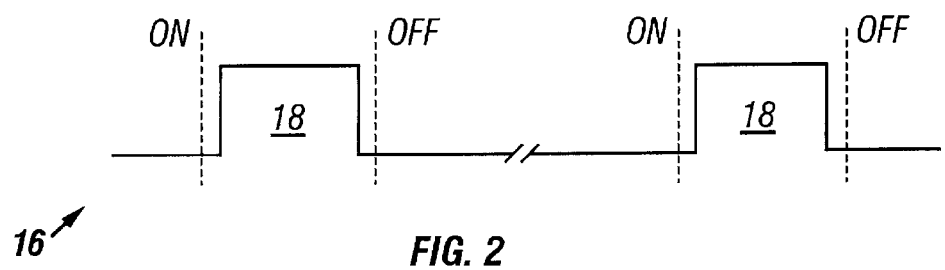
FIG. 2 shows the burst nature of TDMA operation.

A representative digital signal 16 generated at the output of device 14 is shown in FIG. 2. Data signal 16 includes a plurality of data bursts 18, each of which may comprise either data or control information. To minimize power consumption, it is necessary to activate receiver 12 just prior to receipt of each data burst 18. With proper timing, it will be appreciated that circuit 10 may be activated just prior to receipt and quickly de-activated just after receipt of the data so as to minimize power consumption. Upon receipt, data burst 18 is stored in memory associated with interpolator 15 and processed to obtain timing correlation information using known correlation processes. This correlation information is used in many functions of the mobile unit's operation but in context of the present invention, it is used in determination of the time of arrival of each burst 18 and to refine the activation of receiver 12. Interpolator 15 includes computing means capable of performing basic mathematical functions and, as one skilled in the art will appreciate, may be implemented as a series of computer language instructions operated upon by a computer processor.

Figure 3:
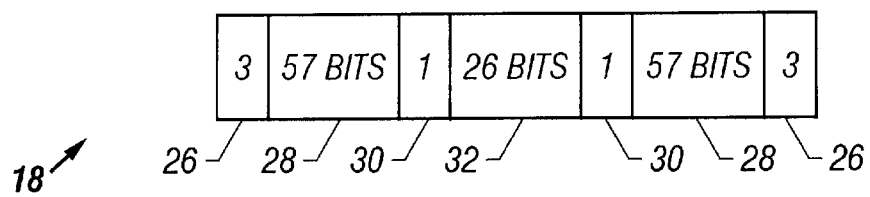
FIG. 3 shows the informational structure of a representative TDMA burst.

As shown in FIG. 3, each normal data burst 18 in a GSM system includes 114 bits of information transmitted in two packets 28. The initial packet is preceded by a three-bit tail 26. A trailing stealing bit 30 specifies whether the packet comprises data or control information. The second packet in burst 18 is a mirror image having stealing bit 30 preceding packet 28 and a trailing three bit tail 26.

Separating packets 28 is a mid-amble 32; a phase modulated signal comprising a known 26-bit pattern. The peak, that results from correlating the received mid-amble with a copy known to the receiver, when located, defines bit positions for tail bits 26, stealing bits 30 and information packets 28 of burst 18. It should be noted that the peak being detected is generated as a result of performing a correlation of the received and a copy that the receiver has in store via network information. Due to timing misalignment between the mobile and the base station, the actual location of the peak may vary, so accurately determining the position of the peak may result in fewer transmission errors and will allow for precise timing of when the receiver is fully operational.

Figure 4:
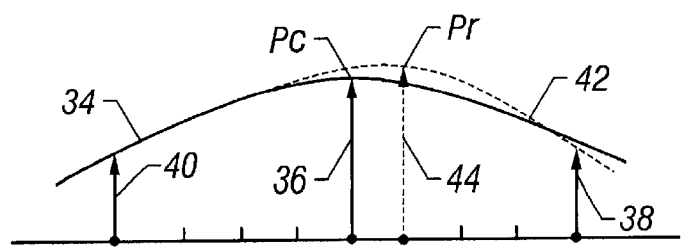
FIG. 4 illustrates parabolic interpolation.

Referring now to FIG. 4, a representative portion of mid-amble correlation is illustrated. When digitized, mid-amble correlation consists of a plurality of samples where each sample denotes the amplitude of the correlation at a particular time.

The received mid-amble is correlated with a copy of mid-amble known to the receiver to obtain a coarse peak location, however its accuracy is not adequate for timing estimation. Hence, one needs to define the refined peak location via interpolation.

In FIG. 4, sample 36 is designated as the coarse peak, $P_c$ with position c, since it has the largest magnitude. Once the coarse peak is defined, the two adjacent samples, $(P_{c+1})$ 38 and $(P_{c-1})$ 40 are selected with positions c+1 and c−1 and a second order polynomial curve 42 is fitted to sample points 36, 38 and 40.

The present invention recognizes that curve fitting is possible because of the well-defined boundaries of mid-amble 32 and the knowledge that the location of the actual or refined peak is located within these boundaries. The parabolic interpolator performs a local curve fit around the coarse peak and sets up proper timing for transmission and receipt of bursts based on refinement of the peak position.

Specifically, by fitting a curve between the sample points 36, 38 and 40, it is possible to define a refined peak, $P_r$ with position r, which is expected to satisfy the following equation:

$$c-1 < r < c+1 \tag{1}$$

This relationship is expected since the refined peak, $P_r$, will reside near the coarse peak although it may be offset therefrom by an unknown delta. Accordingly, the relationship between the refined peak, $P_r$, and the coarse peak, $P_c$, may be further defined by the following equation:

$$r = c + x \tag{2}$$

A polynomial curve, as defined by the quadratic equation (3), is fitted to samples, 36, 38 and 40 as follows:

$$f(x) = \alpha x^2 + \beta x + \gamma \tag{3}$$

Where the coefficients are defined as:

$$\alpha = 0.5 \ast [(P_{c+1}) + (P_{c-1})] - P_c \tag{4}$$

$$\beta = 0.5 \ast [(P_{c+1}) - (P_{c-1})] \tag{5}$$

$$\gamma = P_c \tag{6}$$

It will be noted from above, equations (4) through (6) that value for samples 36, 38 and 40 are known and by substituting for x at −1, 0 and 1, specific values of the curve's coefficients may be obtained. Specifically, for x=0, equation (3) provides:

$$f(0) = \gamma = P_c \tag{7}$$

when equation (3) is solved for samples 40 and 36 (that is, x=1 and x=−1 respectively), it reduces to:

$$f(1) = \alpha + \beta + \gamma \tag{8}$$

and $$f(-1) = \alpha - \beta + \gamma \tag{9}$$

By taking the sum and difference of equations (8) and (9), it is possible to solve for x.
Specifically:

$$x = -(\beta/2\alpha) \tag{10}$$

Accordingly, for each burst, by merely solving equation (10), it is possible to determine whether any timing adjustments are necessary to obtain time of arrival of the burst.

One skilled in the art will appreciate that the multiply, divide and addition operations necessary to obtain values for the coefficients and the solution to equation (10) are substantially less than the ninety-six multiply-accumulate operations that must be performed on each sample in related art embodiments using FIR filter technology. Or any other numerical method employed such as cubic spline.

Once the value for x is determined, quantization may be used to more precisely define the location of the refined peak, $P_r$, relative to the coarse peak. In one preferred embodiment, interpolation of a data point between sample pairs (that is, between samples 36 and 38 or between samples 36 and 40) is accomplished by positioning the refined peak, $P_r$, in one of a plurality of bins. In one preferred embodiment, four bins provide sufficient accuracy to achieve resolution of ⅛ bit for a system which is running at twice nyquist rate. It will be appreciated that based on the value of x, for $0<|x|<1$, the refined peak, $P_r$, is shifted into a corresponding bin. For example, if $0<|x|<0.25$, the refined peak, $P_r$, is shifted into the bin adjacent to the course peak.

One skilled in the art will appreciate that the if the value of x is between 0.25 and 0.75, the refined peak, $P_r$, will be shifted into a corresponding one of the two middle bins. It will be further appreciated that the direction (i.e., either toward sample 36 or sample 40) of the shift depends on the sign of x. It being understood that a positive sign indicates that the sample arrived later in time relative to the coarse peak and a negative sign indicates that the sample arrived earlier. As shown in FIG. 4, the value of x is positive and is less than 0.25 so the refined peak is shifted to the right toward sample 40 by one bin as indicated at 44. If further refinement of the position of the refined peak is desired, additional bins may be defined so that there are eight, sixteen or more bins between sample pairs.

Advantageously, the present invention obtains approximately a 50:1 decrease in computations required to find the peak compared to related art implementations using a ninety-six tap FIR filter. Further, there is a corresponding decrease in storage resources as well since there is no need to store tap coefficients or intermediate results of the multiply-accumulate operations. Further still, since users of mobile communication devices will continue to require faster data speeds to be able to use multimedia applications, the present invention frees up processor compute capacity for data compression or other data related functions rather than implementing complex FIR or other software filter algorithms. Accordingly, the present invention provides capacity to receive data at high speeds at a slower processor speed.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In a time domain multiple access mobile communication system having at least one base station and at least one mobile unit where information is transmitted therebetween in a burst transmission mode, an apparatus for locating a known pattern in each signal burst so as to synchronize system timing of said mobile unit with said base station, said apparatus comprising:

a receiver, said receiver recovering said signal bursts and developing base-band complex digital samples from said signal burst; and a correlator and interpolator, said correlator and interpolator determining the time of arrival of each signal burst and refining the activation of said receiver, said interpolator comprising a parabolic interpolator for comparing correlator samples and selecting a coarse peak indicating a coarse estimate of the time of arrival of a signal burst from correlator samples derived from a portion of said signal burst and interpolating a time offset of a fine peak relative to said course peak by fitting a second order polynomial curve to a first sample corresponding to the course peak and one or more adjacent samples on either side of the first sample, and determining the time offset of the fine peak relative to the course peak based on where the polynomial reaches a maximum.

2. The system of claim 1 wherein said interpolator further comprises a computer, said computer determining a time offset of said fine peak relative to said coarse peak.

3. The system of claim 2 wherein said computer evaluates, for each signal burst, the equation $x=-(\beta/2\alpha)$ where the variables $\beta$ and $\alpha$ comprise coefficients of a parabolic curve and x denotes the time offset of said fine peak relative to said coarse peak.

4. The invention of claim 3 wherein said computer quantizes the value of x so that the fine peak is positioned in one of a plurality of bins defined by said computer between said coarse peak and at least two adjacent samples.

5. In a time domain multiple access mobile communication system where data is transmitted in bursts and where each of said bursts contains a preamble, data packets and a mid-amble comprising a known embedded signal pattern, a method for determining the time of arrival of said embedded pattern comprising the steps of:

generating a series of digital samples of said bursts corresponding to said mid-amble;

performing a correlation between the received mid-amble and a copy of the mid-amble which produces a peak indicative of a coarse timing estimate of the time of arrival of a burst or embedded pattern within the burst;

selecting the preceding and subsequent sample adjacent to said selected sample;

using the values of said samples to solve the equation $x=-(\beta/2\alpha)$ where the variables $\beta$ and $\alpha$ comprise coefficients of a second order polynomial curve fitted to said three samples and x denotes the peak of the polynomial curve and is an estimate of a time offset from the peak indicative of the coarse timing estimate; and quantizing the value of x relative to said peak indicative of the coarse timing estimate.

6. The method of claim 5 further comprising the step of defining a fine peak relative to said coarse peak at a position between said coarse peak and one of said adjacent samples, inclusive, corresponding to the quantized value of x.

7. The method of claim 6 further comprising the step of adjusting the timing of said system relative to said fine peak.

8. In a time domain multiple access mobile communication system where data is transmitted in bursts and where each of said bursts contains a preamble, data packets and a mid-amble comprising a known embedded signal pattern, a method for determining the time of arrival of said embedded pattern comprising the steps of:

generating a series of digital samples of said bursts corresponding to said mid-amble;

performing a correlation between the received mid-amble and a copy of the mid-amble which produces a peak indicative of a coarse timing estimate;

selecting the preceding and subsequent sample adjacent to said selected sample;

using the values of said samples to solve the equation $x=-(\beta/2\alpha)$ where the variables $\beta$ and $\alpha$ comprise coefficients of a polynomial curve defined by the equation $f(x)=\alpha x^2+\beta x+\gamma$ where the coefficients are defined as:

$$\alpha=0.5*[(P_{c+1})+(P_{c-1})]-P_c$$

$$\beta=0.5*[(P_{c+1})-(P_{c-1})]$$

$$\gamma=P_c,$$

where $P_c$, $(P_{c+1})$ and $(P_{c-1})$ correspond to said largest sample and said adjacent samples, respectively, and where the curve is fitted to said three samples and x denotes the peak of the polynomial curve; and quantizing the value of x relative to said coarse peak.

9. The method of claim 8 wherein said solving step comprises substituting the values of said samples for x at −1, 0 and 1.

10. In a time domain multiple access mobile communication system where data is transmitted in bursts and where each of said bursts contains a preamble, data packets and a mid-amble comprising a known embedded signal pattern, a method for determining the time of arrival of said embedded pattern comprising the steps of:

generating a series of digital samples of said bursts corresponding to said mid-amble;

performing a correlation between the received mid-amble and a copy of the mid-amble which produces a peak indicative of a coarse timing estimate;

selecting the preceding and subsequent sample adjacent to said selected sample;

using the values of said samples to solve the equation $x=-(\beta/2\alpha)$ where the variables $\beta$ and $\alpha$ comprise coefficients of a polynomial curve fitted to said three samples and x denotes the peak of the polynomial curve; and quantizing the value of x relative to said coarse peak by:
defining a plurality of bins between said largest sample and each of said adjacent samples;
defining a fine peak offset from the coarse peak; and
positioning the refined peak in one of said bins corresponding to the quantized value of x.

11. In a mobile communication system, a method for determining the time of arrival of a burst of data comprising the steps of:

receiving burst transmissions having an embedded timing information;

identifying a coarse approximation of the location of the embedded timing information;

defining a polynomial curve around said coarse approximation of the location of the control signal;

calculating a refined peak corresponding to the peak of said polynomial curve; and determining the timing offset of said refined peak relative to the coarse approximation of said control signal.

12. The method of claim 11 further comprising the step of synchronizing timing operations based on the time of receipt of the fine peak.

13. The method of claim 11 wherein said determining step further comprises the steps of:

defining a plurality of bins adjacent to said coarse approximation of said control signal;

positioning the fine peak in one of said bins corresponding to a quantization of the offset.

14. The method of claim 11 wherein said defining step further comprises the step of fitting the polynomial curve as defined by the equation $f(x)=\alpha x^2+\beta x+\gamma$ where the coefficients are defined as:

$$\alpha=0.5*[(P_{c+1})+(P_{c-1})]-P_c$$

$$\beta=0.5*[(P_{c+1})-(P_{c-1})]$$

$$\gamma=P_c$$

and where $P_c$, $(P_{c+1})$ and $(P_{c-1})$ correspond to one of a digital sample identified as the coarse approximation of said control signal and at least two adjacent digital samples of said burst, respectively.

15. The method of claim 14 wherein said solving step comprises substituting the values of said samples for x at −1, 0 and 1.

16. The method of claim 11 wherein said calculating step comprises solving the equation $x=-(\beta/2\alpha)$ for x where the variables $\beta$ and $\alpha$ comprise coefficients of a polynomial curve fitted around said coarse approximation of said control signal and x denotes the peak of the polynomial curve.

17. The method of claim 11 wherein said calculating step comprises the step of fitting the polynomial curve as defined by the equation $f(x)=\alpha x2+\beta x+\gamma$ where the coefficients are defined as:

$$\alpha=0.5*[(P_{c+1})+(P_{c-1})]-P_c$$

$$\beta=0.5*[(P_{c+1})-(P_{c-1})]$$

$$\gamma=P_c$$

and where $P_c$, $(P_{c+1})$ and $(P_{c-1})$ correspond said coarse approximation of said control signal and at least two adjacent digital samples of said burst, respectively.

18. In a time domain multiple access communication system where data is transmitted in bursts, a method for determining the time of arrival of a burst comprising the steps of:

generating a series of digital samples of a burst;

performing a correlation between the series of digital samples and a predetermined pattern to determine a peak indicative of a coarse estimate of the time of arrival of the burst;

determining coefficients of a second order polynomial curve from a correlation sample corresponding to the peak indicative of the coarse estimate and one or more adjacent correlation samples; and determining a time offset from said peak indicative of said coarse estimate based on said coefficients.

* * * * *

UNITED STATES PATENT AND TRADEMARK OFFICE
CERTIFICATE OF CORRECTION

PATENT NO. : 6,219,345 B1
DATED : April 17, 2001
INVENTOR(S) : Clark et al.

It is certified that error appears in the above-identified patent and that said Letters Patent is hereby corrected as shown below:

Column 3,
Line 13, delete [antenna 111], insert: -- antenna 11 --.

Signed and Sealed this

Thirtieth Day of October, 2001

Attest:

NICHOLAS P. GODICI
*Acting Director of the United States Patent and Trademark Office*

*Attesting Officer*